(12) United States Patent
Norrell et al.

(10) Patent No.: US 6,542,028 B1
(45) Date of Patent: Apr. 1, 2003

(54) SYSTEM AND METHOD FOR EFFICIENT DEMODULATION AND FILTERING OF A RECEIVED SIGNAL

(75) Inventors: Andrew L. Norrell, Nevada City, CA (US); Philip DesJardins, Nevada City, CA (US); Carl Alelyunas, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 09/916,931

(22) Filed: Jul. 27, 2001

Related U.S. Application Data
(60) Provisional application No. 60/221,480, filed on Jul. 27, 2000.

(51) Int. Cl.[7] .................................................. H03D 3/00
(52) U.S. Cl. ........................................ 329/304; 708/627
(58) Field of Search ................................ 329/300–303, 329/308–310, 304; 375/325, 328; 455/323; 708/603, 627

(56) References Cited

U.S. PATENT DOCUMENTS 5,287,299 A * 2/1994 Lin ............................ 708/303

* cited by examiner

Primary Examiner—Robert Pascal
Assistant Examiner—Kimberly E Glenn
(74) Attorney, Agent, or Firm—Carr & Ferrell LLP; Wendi R. Schepler

(57) ABSTRACT

An efficient demodulation and low pass filter structure comprises a shift-add-negate structure that effectively multiplies each received sample by a combined demodulation and filter coefficient, and an accumulator that accumulates the products. Low pass filter coefficients are selected such that the shift-add-negate structure implements multiplications by shifts, adds, and negations. In the preferred embodiment, the demodulation and low pass filter structure outputs three complex samples per symbol.

31 Claims, 6 Drawing Sheets

Fig. 6

| Sample # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| cos(βk) | 1 | 0 | -1 | 0 | 1 | 0 | -1 | 0 | 1 | 0 | -1 | 0 | 1 | 0 | -1 | 0 | 1 | 0 | -1 | 0 | 1 | 0 | -1 | 0 | 1 | 0 | -1 | 0 |
| -sin(βk) | 0 | -1 | 0 | 1 | 0 | -1 | 0 | 1 | 0 | -1 | 0 | 1 | 0 | -1 | 0 | 1 | 0 | -1 | 0 | 1 | 0 | -1 | 0 | 1 | 0 | -1 | 0 | 1 |
| LPF 1 Coeff | 1 | 4 | 4 | 4 | 4 | 3 | 1 | 4 | 4 | 3 | 4 | 1 |  | 4 | 1 | 3 | 4 | 4 | 4 | 3 | 1 | 4 | 4 | 4 | 3 | 1 |  |  |
| LPF 2 Coeff | 3 | 1 |  |  | 4 | 3 | 1 | 4 | 4 | 3 | 1 | 3 | 4 | 4 | 1 | 3 | 4 |  |  | 1 | 3 | 4 | 4 | 4 | 3 | 1 |  |  |
| LPF 3 Coeff | 4 | -4 |  | 4 |  | -3 | -1 |  |  | -3 | -1 |  | 4 | -1 | -4 |  |  | -4 |  |  | 3 |  |  | 4 | 3 |  |  | 4 |
| Register 1 R |  |  |  |  |  |  |  |  |  |  |  |  |  |  | 3 |  |  |  |  | 3 |  |  |  |  | 3 |  |  |  |
| Register 1 Q |  |  |  |  |  |  |  |  |  | -3 | -1 |  | 4 | -4 |  |  |  | -4 |  |  | 3 |  | -4 |  |  | -1 | -4 |  |
| Register 2 R |  | -1 |  |  |  | -1 |  |  |  | -1 |  |  | 4 | -4 |  |  | 1 |  |  | 1 |  |  |  | 4 | 1 |  |  |  |
| Register 2 Q |  |  |  |  |  |  |  |  |  |  |  |  |  |  | 3 |  |  |  |  |  | 3 |  |  |  |  | -3 |  | 4 |
| Register 3 Q | -3 | -3 |  |  |  |  |  |  |  | 3 | 3 |  |  | -4 | 3 |  |  |  |  |  |  |  |  |  | -3 |  | -4 | 4 |
| Output Select | 3Q3R |  |  |  |  | 1Q1R |  |  |  |  | 2R2Q |  |  |  |  | 3Q3R |  |  |  | 1Q1R |  |  |  |  | 2R2Q |  |  |  |

SYSTEM AND METHOD FOR EFFICIENT DEMODULATION AND FILTERING OF A RECEIVED SIGNAL

CROSS-REFERENCE TO RELATED APPLICATION

This application is related to, and claims the benefit of, U.S. Provisional Patent Application Serial No. 60/221,480, entitled "Efficient Demodulation/Low Pass Filter Structure," filed Jul. 27, 2000. The subject matter of the related application is hereby incorporated by reference.

BACKGROUND SECTION

1. Technical Field

This invention relates generally to electronic communication systems and more particularly to efficient demodulation and filtering of a received signal.

2. Description of the Background Art

Modem receivers typically receive a real passband signal from the transmission medium, since any real transmission medium can only carry real signals. Transmitted data are typically encoded as complex symbols, so a receiver needs to decode complex symbols to recover the data. Receivers typically convert the received real passband signal into a complex baseband signal prior to decoding.

Techniques for converting a received real passband signal into a complex baseband signal include a Hilbert filter-demodulation technique and a demodulation-low pass filter technique. Most digital filtering techniques include multiplications of input samples by predetermined filter coefficients. Most demodulation techniques include multiplications to remove the carrier signal. Physical general-purpose multipliers are typically the most costly components in electronic systems, both in terms of financial costs and efficiency.

SUMMARY

A system and method are disclosed to implement efficient demodulation and filtering of a received signal. The system for demodulation and low pass filtering comprises three add-shift-negate modules configured to receive a real sample and to produce an output equal to the real sample multiplied by a coefficient, and three accumulators, where each accumulator is configured to accumulate the outputs of one of the three add-shift-negate modules. The system also includes a multiplexer that selectively outputs the contents of the accumulators. The contents of the accumulators represent complex recovered samples. The multiplexer preferably outputs three complex recovered samples per symbol at a frame rate of 2 million symbols per second.

The system of the invention is not implemented with physical multipliers. Each shift-add-negate device multiplies a real sample by a coefficient using only shifts, addition, and negation. Each coefficient represents a value of a demodulating signal multiplied by one of a set of low pass filter coefficients. In the preferred embodiment, the set of low pass filter coefficients is 1, 3, 4, 4, 4, 3, 1. The demodulating signal has values of 1, 0, and −1. Thus, in the preferred embodiment, each shift-add-negate module either ignores the real sample or effectively multiplies the real sample by ±1, ±3, or ±4. The operation of each shift-add-negate module is controlled by the state of a state machine.

BRIEF DESCRIPTION OF THE DRAWINGS

FIG. 6 is a table showing one embodiment of a structure of a receiver frame.

DETAILED DESCRIPTION OF THE INVENTION

Figure 1:
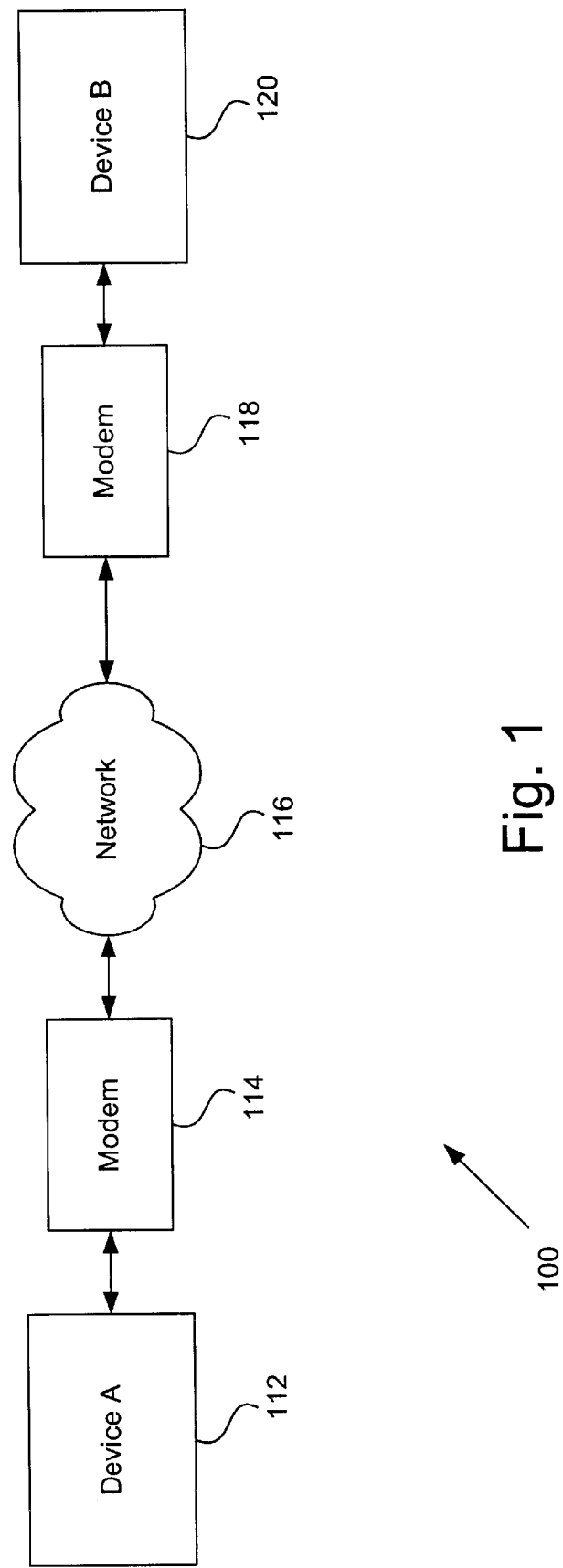
FIG. 1 is a block diagram of one embodiment of an electronic communication system.

FIG. 1 is a block diagram of one embodiment of an electronic communication system 100 including a device A 112, a modem 114, a network 116, a modem 118, and a device B 120. Although modem 114 and modem 118 are shown outside of device A 112 and device B 120, each modem 114 and 118 may be implemented inside their respective devices. Network 116 may be a wide area network (WAN), such as the Internet, or a local area network (LAN), such as a home network. In one embodiment, modems 114 and 118 are configured to operate in accordance with the Home Phoneline Networking Alliance (HomePNA or HPNA) 2.0 standard. Details regarding the HomePNA 2.0 standard are disclosed in "Interface Specification for HomePNA 2.02.7 10M8 Technology" by Home Phoneline Networking Alliance, herein incorporated by reference. Each modem 114, 118 includes a transmitter for transmitting modulated signals over network 116, and a receiver for receiving and demodulating signals.

Figure 2:
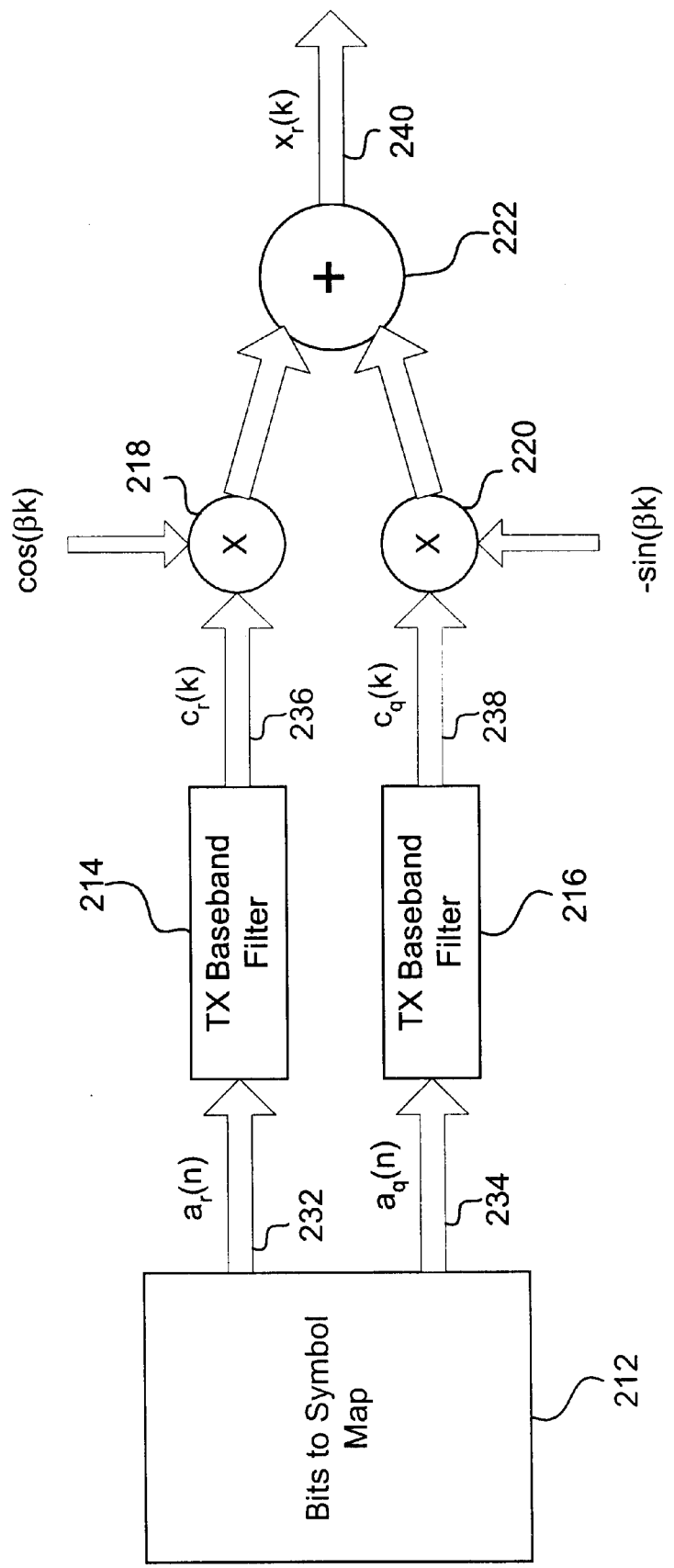
FIG. 2 is a block diagram of one embodiment of a transmitter.

FIG. 2 is a block diagram of one embodiment of a transmitter 200 including a bits to symbol map 212, transmit (TX) baseband filters 214, 216, multipliers 218, 220, and an adder 222. Data to be transmitted are first converted from bits to 2-dimensional complex symbols by map 212. The real part of these symbols, $a_r(n)$, is sent via path 232 to TX baseband filter 214. The complex part of these symbols, $a_q(n)$, is sent via path 234 to TX baseband filter 216. In the FIG. 2 embodiment, the symbol rate corresponding to index n is preferably 2 million symbols per second.

TX baseband filters 214, 216 produce shaped and interpolated baseband samples, $c_r(k)$ and $c_q(k)$, for modulation. As part of the filtering process, TX baseband filters 214, 216 zero stuff the symbols a(n) to produce a sample rate corresponding to the index k. The complex baseband samples are then modulated by a complex sinusoid that may be represented as $\cos(\beta k)+j\sin(\beta k)$, where $\beta=2\pi$(carrier frequency, $f_c$/sampling frequency, $f_s$), k is a sample index, and $j=\sqrt{-1}$.

Since any communication channel is real, typically only the real part of the modulated signal is generated. Transmitter 200 implements this modulation by first multiplying $c_r(k)$ by $\cos(\beta k)$ using multiplier 218, and by multiplying $c_q(k)$ by $-\sin(\beta k)$ using multiplier 220. The outputs of multipliers 216 and 218 are then added by adder 222 to produce the real transmitted signal $x_r(k)=c_r(k)\cos(\beta k)-c_q(k)\sin(\beta k)$. In the FIG. 2 embodiment of transmitter 200, the passband sample rate corresponding to index k is 28 million samples per second.

Figure 3:
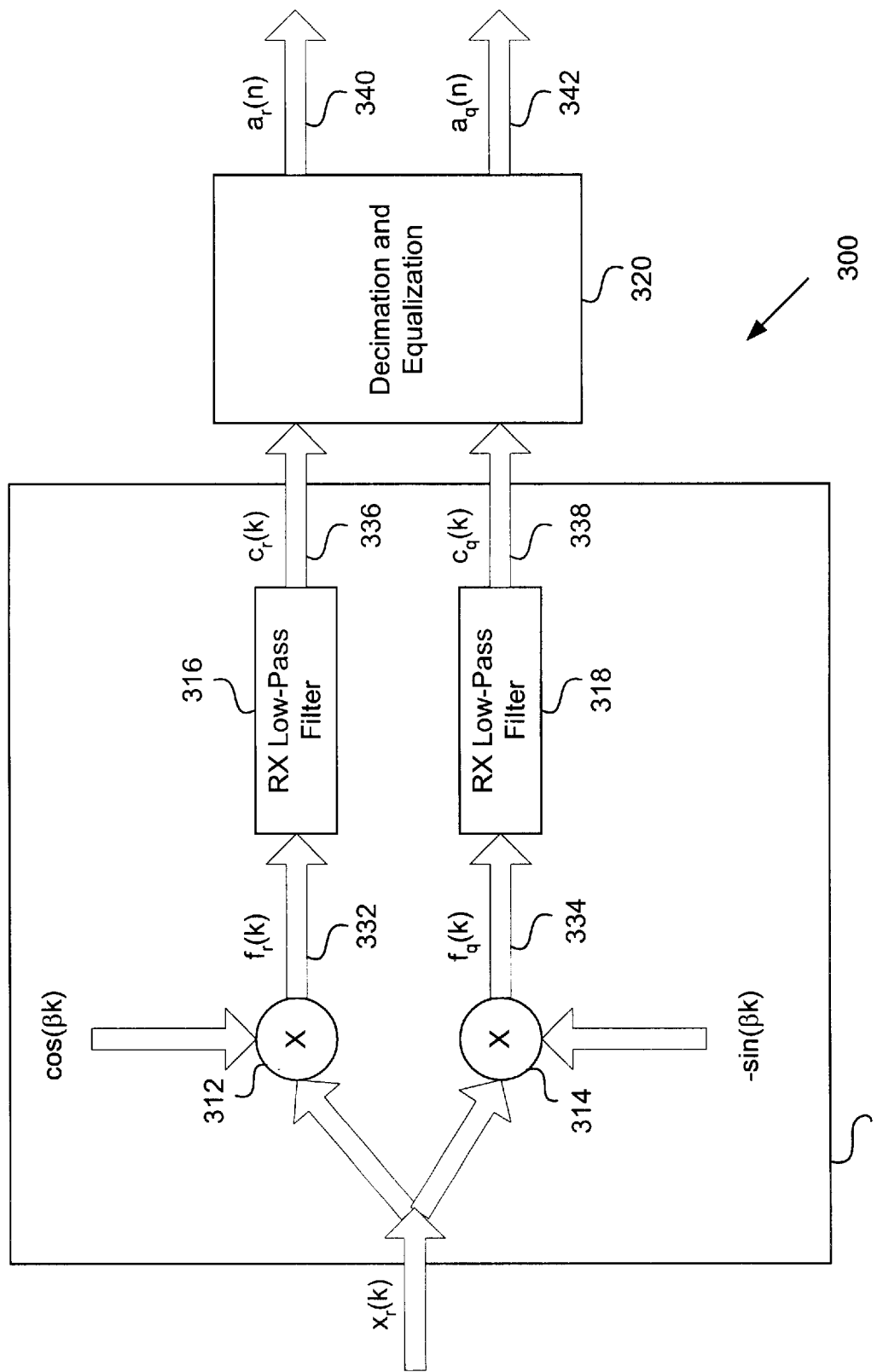
FIG. 3 is a functional block diagram of one embodiment of a receiver.

FIG. 3 is a functional block diagram of one embodiment of a receiver 300 that includes multipliers 312 and 314, receiver (RX) low-pass filters 316 and 318, and a decimation and equalization module 320. Multipliers 312 and 314 and RX low pass filters 316 and 318 form one embodiment of a demodulation and low pass filter structure 310. For the purposes of discussion, the transmitted signal $x_r(k)$ is assumed to be received by receiver 300 unaffected by additive noise, timing offset, and other possible effects from passing through physical media. Receiver 300 must construct a new imaginary term and remove the carrier signal to recover the complex data samples a(n). Modem receivers may use various techniques for recovering data, for example Hilbert filtering followed by demodulation, or demodulation followed by low-pass filtering. Receiver 300 uses demodulation followed by low-pass filtering and decimation and equalization to recover the complex data samples a(n).

When received by receiver 300, the transmitted signal $x_r(k)$ is multiplied with $\cos(\beta k)$ by multiplier 312, and with $-\sin(\beta k)$ by multiplier 314. The output of multiplier 312, $f_r(k)$, is equal to $[c_r(k)*\cos(\beta k)-c_q(k)*\sin(\beta k)]*\cos(\beta k)$. The output of multiplier 314, $f_q(k)$, is equal to $[c_r(k)*\cos(\beta k)-c_q(k)*\sin(\beta k)]*-\sin(\beta k)$. These two equations reduce to:

$$f_r(k)=c_r(k)*[1-\cos(2*\beta k)]-c_q(k)*\sin(2*\beta k)$$

$$f_q(k)=c_r(k)*-\sin(2*\beta k)+c_q(k)*[1+\cos(2*\beta k)].$$

The signals $f_r(k)$ and $f_q(k)$ are then filtered by RX low-pass filters 316 and 318, respectively, to remove the double frequency components. The outputs of filters 316 and 318 are $c_r(k)$ and $c_q(k)$, respectively. Decimation and equalization module 320 then processes these signals to produce the complex baseband data samples $a_r(n)$ and $a_q(n)$. Decimation removes the zero padding and equalization removes any intersymbol interference (ISI).

The demodulation and low-pass filter structure 310 of receiver 300 may be implemented in various embodiments. The characteristics of filters 316 and 318, such as the cut-off frequencies, are designed with reference to the sampling frequency and carrier frequency of the transmitted signal. The preferred embodiment of receiver 300 is configured to receive signals with a carrier frequency, $f_c$, of 7 MHz and a sampling frequency, $f_s$, of 28 million samples per second.

Figure 4A:
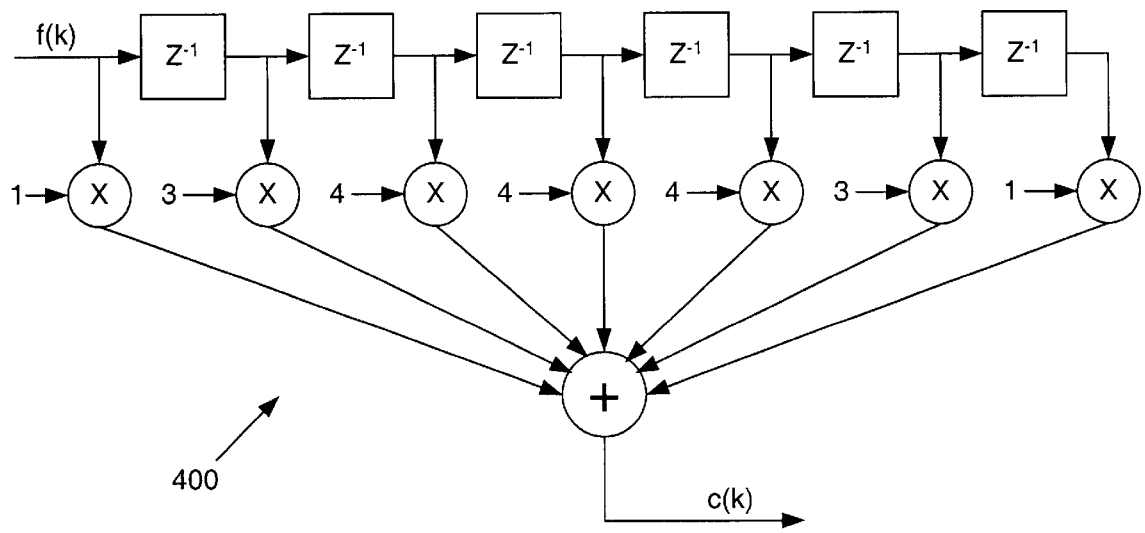
FIG. 4(a) is a block diagram of one embodiment of a low-pass filter of the receiver of FIG. 3.

FIG. 4(a) is a functional block diagram of one embodiment of a low-pass filter 400. Filter 400 is a 7-tap finite impulse response (FIR) filter. Filter 400 has six delay elements and has the filter coefficients 1, 3, 4, 4, 4, 3, and 1. The filter coefficients of filter 400 were selected to satisfy the HomePNA 2.0 receiver application at a sample rate of 28 million samples per second and a symbol rate of 2 million symbols per second. Each delay element $Z^{-1}$ stores an input value for one clock cycle. The functions of RX low-pass filters 316 and 318 are preferably implemented by filter 400.

Figure 4B:
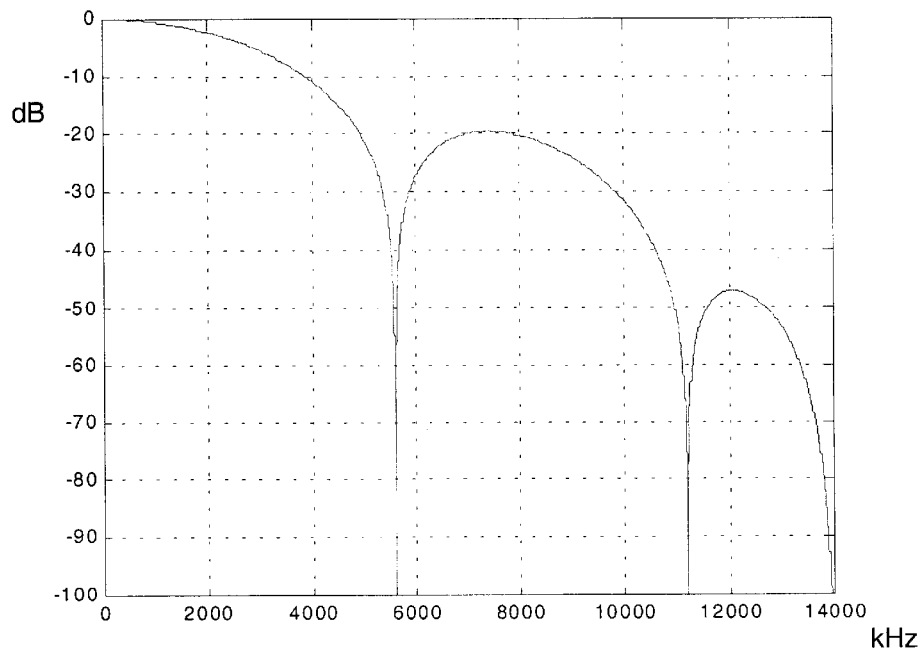
FIG. 4(b) is a diagram of the frequency response of the low-pass filter of FIG. 4(a)

FIG. 4(b) is a diagram of the frequency response of the low-pass filter 400 of FIG. 4(a). The horizontal axis shows kilohertz and the vertical axis shows decibels. This frequency response is very effective for the preferred Home-PNA 2.0 receiver application at the sampling frequency of 28 million samples per second and a symbol rate of 2 million symbols per second. As described above, the received samples are demodulated by a complex sinusoid $\cos(\beta k)-j\sin(\beta k)$, where $\beta=2\pi(f_c/f_s)$, $f_c$ is a carrier frequency, and $f_s$ is a sampling frequency. For $f_c=7$ MHz and $f_s=28$ million samples per second, $\beta=\pi/2$, so the terms for this sinusoid are the following sequences:

$$\cos(k\pi/2)=1, 0, -1, 0,$$

$$-\sin(k\pi/2)=0, -1, 0, 1,$$

Thus, during demodulation, each received sample is either passed (equivalent to multiplying by 1), ignored (equivalent to multiplying by 0), or negated (equivalent to multiplying by −1).

The multiplication of coefficients of filter 400 may be accomplished using shifts and adds. A sample value may be multiplied by 1 by passing it through unchanged. A sample value may be multiplied by 3 by left shifting the sample one binary place and adding the unshifted sample value to the shifted sample value. For example, a sample value 0010 is left shifted one binary place (0100) and the unshifted sample value (0010) is added to the shifted sample value to produce 0110. A sample value may be multiplied by 4 by left shifting the sample value two binary places. For example, a sample value 0010 is left shifted two binary places to produce 1000. Implementing the multiplications of filter coefficients by shifts and adds significantly simplifies the implementation of filter 400. Also, since multipliers are typically high cost components, implementing filter 400 without multipliers results in significant cost savings.

Figure 5:
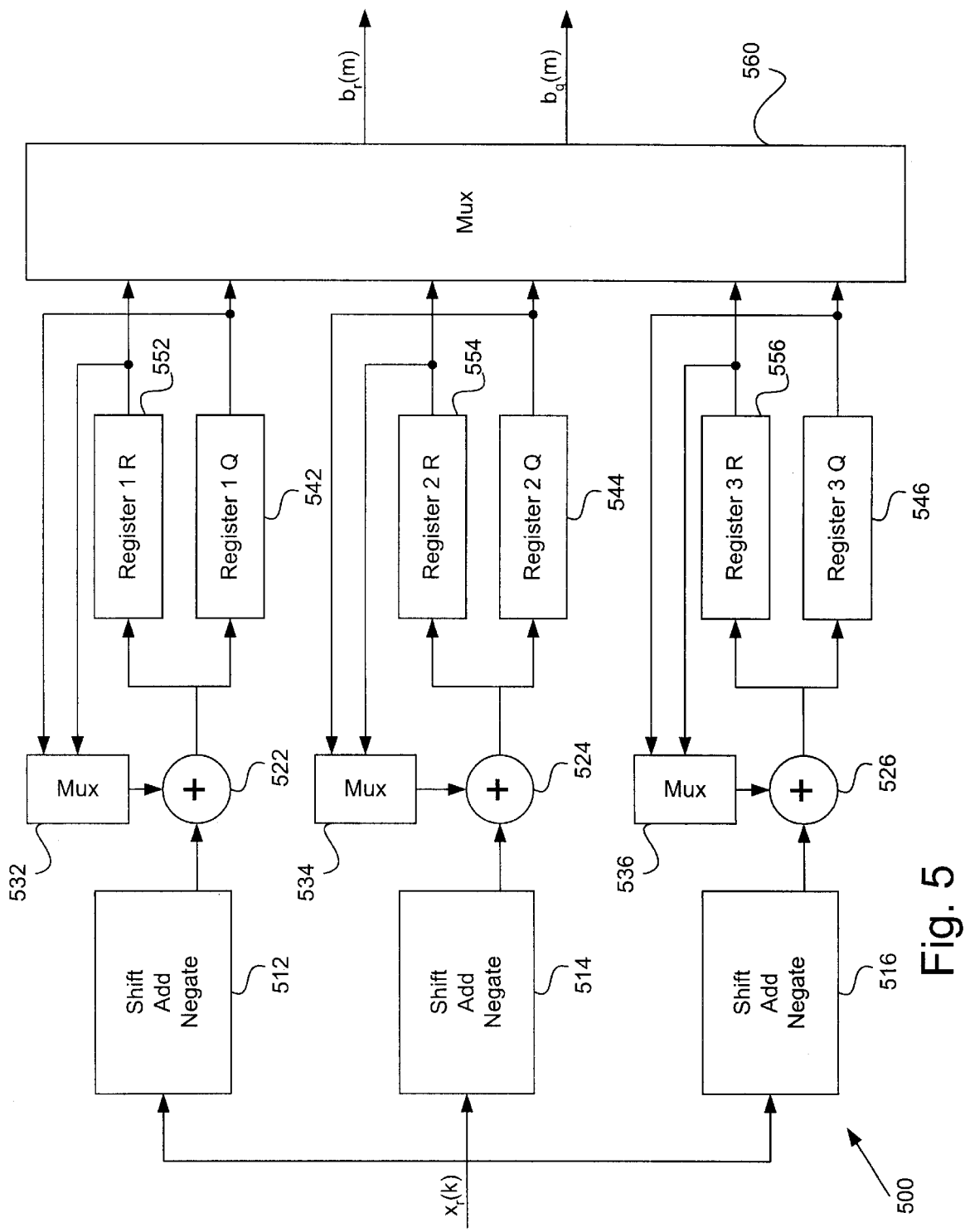
FIG. 5 is a block diagram of one embodiment of an efficient demodulation and low-pass filtering structure.

FIG. 5 is a block diagram for one embodiment of an efficient demodulation and low-pass filtering structure 500. Structure 500 replaces the demodulation and low pass filter structure 310 in receiver 300 of FIG. 3. Structure 500 performs the functions of a demodulator and three low-pass filters, and generates three complex output samples b(m) per symbol. Structure 500 implements demodulation and low-pass filtering without any multiplications or multipliers, thus saving time, power, and cost.

Received real data samples $x_r(k)$ are input to shift-add-negate 512, 514, 516 modules. These modules perform multiplications by shifting, adding, and/or negating the data samples. The functions of shift-add-negate 512, 514, and 516 are controlled by a state machine (not shown). Shift-add-negate 512, 514, and 516 multiply received samples by ±1, ±3, or ±4 according to the state of the state machine.

The output of shift-add-negate 512 is added to the output of a multiplexer 532 by an adder 522. This sum is stored in a register 1R 552 or a register 1Q 542 according to control signals from the state machine (not shown). The combination of adder 522 and register 1R 552 and register 1Q 542 implements an accumulator. The inputs to multiplexer 532 are the contents of register 1R 552 and register 1Q 542. The output of shift-add-negate 514 is added to the output of a multiplexer 534 by an adder 524. This sum is stored in a register 2R 554 or a register 2Q 544 according to control signals from the state machine. The inputs to multiplexer 534 are the contents of register 2R 554 and register 2Q 544. The output of shift-add-negate 516 is added to the output of a multiplexer 536 by an adder 526. This sum is stored in a register 3R 556 or a register 3Q 546 according to control signals from the state machine. The inputs of multiplexer 536 are the contents of register 3R 556 and register 3Q 546. The outputs of multiplexers 532, 534, 536 are selected by control signals from the state machine.

The outputs from registers 552, 542, 554, 544, 556, and 546 are input to a multiplexer 560. The outputs of multiplexer 560 are the recovered complex data samples, $b_r(m)$ and $b_q(m)$, where m is the symbol frame rate. The preferred symbol frame rate is 1 million frames per second, which is half the symbol rate. Structure 500 preferably outputs six complex samples per two-symbol frame. For an input $x_r(k)$, the six complex samples per frame are:

$$b_r(6m)=x_r(k)-4*x_r(k+2)+4*x_r(k+4)-x_r(k+6)$$

$$b_q(6m)-3*x_r(k+1)+4*x_r(k+3)-3*x_r(k+5)$$

$$b_r(6m+1)=-3*x_r(k+6)+4*x_r(k+8)-3*x_r(k+10)$$

$$b_q(6m+1)=-x_r(k+5)+4*x_r(k+7)-4*x_r(k+9)+x_r(k+11)$$

$$b_r(6m+2)=-x_r(k+10)+4*x_r(k+12)-4*x_r(k+14)+x_r(k+16)$$

$b_q(6m+2)=3*x_r(k+11)-4*x_r(k+13)+3*x_r(k+15)$ $b_r(6m+3)=-x_r(k+14)+4*x_r(k+16)-4*x_r(k+18)+x_r(k+20)$ $b_q(6m+3)=3*x_r(k+15)-4*x_r(k+17)+3*x_r(k+19)$ $b_r(6m+4)=3*x_r(k+20)-4*x_r(k+22)+3*x_r(k+24)$ $b_q(6m+4)=x_r(k+19)-4*x_r(k+21)+4*x_r(k+23)-x_r(k+25)$ $b_r(6m+5)=x_r(k+24)-4*x_r(k+26)+4*x_r(k+28)-x_r(k+30)$ $b_q(6m+5)=-3*x_r(k+25)+4*x_r(k+27)-3*x_r(k+29)$

As seen in the above equations, some samples, for example $x_r(k+5)$ and $x_r(k+6)$, are used more than once per frame. Also, samples $x_r(k+28)$, $x_r(k+29)$, and $x_r(k+30)$ are used as samples $x_r(k)$, $x_r(k+1)$, and $x_r(k+2)$ for the next frame.

FIG. 6 is a table showing one embodiment of a structure of a receiver frame. For each sample in the frame, the table shows the value of the demodulating signal, the low pass filter coefficients, the combined coefficients applied to each register, and the selected outputs of structure 500. The values of cos $(\beta k)=1, 0, -1, 0, \ldots$, and the values of $-\sin(\beta k)=0, -1, 0, 1, \ldots$. The coefficients for each filter are 1, 3, 4, 4, 4, 3, 1 as discussed above in conjunction with FIGS. 4(*a*) & 4(*b*). The combined coefficients applied to each register are the products of the value of the non-zero demodulating signal and the filter coefficient. For example, for sample $x_r(k)$, the value of the non-zero demodulating signal is 1 and the filter coefficients are 1 and 4. The coefficient for the value added to register 1R is 1*1=1, and the coefficient for the value added to register 3R is 1*4=4. Thus, structure 500 multiplies the value of sample $x_r(k)$ by 1 and adds the product to the contents of register 1R, and multiplies the value of sample $x_r(k)$ by 4 and adds the product to the contents of register 3R.

In another example, for sample $x_r(k+5)$, $\cos(\beta k)=0$ and $-\sin(\beta k)=-1$ and the low pass filter coefficients are 3, 1, and 0. So shift-add-negate 512 multiplies the value of sample $x_r(k+5)$ by −3 (shifts the value of the sample to the left by one digit, adds the value of the unshifted sample value, and negates the result) and adder 522 adds the resulting value to the value stored in register 1Q and stores the sum in register 1Q. At the same time, shift-add-negate 514 multiplies the value of sample $x_r(k+5)$ by −1 (negates the value of the sample) and adder 524 adds the resulting value to the value stored in register 2Q and the sum is stored in register 2Q. At the same time, shift-add-negate 516 ignores sample $x_r(k+5)$ and multiplexer 560 outputs the value of register 1Q as $b_q(m)$.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for demodulation and low pass filtering, comprising:
    a shift-add-negate module configured to receive real samples and to produce an output that is equal to a received real sample multiplied by a coefficient that is a product of a demodulating signal and a low pass filter coefficient; and
    an adder configured to add the output of the shift-add-negate module with the contents of a register to produce a sum that is stored in the register.

2. The system of claim 1, wherein the shift-add-negate module produces the output by shifting the received real sample value by at least one binary digit.

3. The system of claim 1, wherein the shift-add-negate module produces the output by shifting the received real sample value by at least one binary digit and adding the received real sample value to the shifted received real sample value.

4. The system of claim 1, wherein the shift-add-negate module produces the output by negating the received real sample value.

5. The system of claim 1, wherein the shift-add-negate module produces the output by shifting the received real sample value by at least one binary digit and negating the shifted received real sample value.

6. The system of claim 1, wherein the shift-add-negate module produces the output by shifting the received real sample value by at least one binary digit, adds the received real sample value to the shifted received real sample value to produce a sum, and negates the sum.

7. The system of claim 1, wherein the adder selectively adds the output of the shift-add-negate module to the contents of a register storing real recovered samples and to the contents of a register storing imaginary recovered samples.

8. The system of claim 1, wherein the low pass filter coefficient is one of a set of low pass filter coefficients including 1, 3, 4, 4, 4, 3, 1.

9. The system of claim 1, wherein values of the demodulating signal are 1, 0, and −1.

10. A system for demodulation and low pass filtering, comprising:
    three shift-add-negate modules, each shift-add-negate module configured to receive a real sample and to produce an output equal to the real sample multiplied by a coefficient;
    three accumulators configured to accumulate the outputs of the three shift-add-negate modules, each accumulator accumulates a real output and an imaginary output of each of the three shift-add-negate modules; and
    a multiplexer configured to selectively output the contents of the three accumulators, where the contents of the three accumulators represent received complex samples.

11. The system of claim 10, wherein each of the three accumulators includes an adder and two registers, where one of the two registers stores real values and the other of the two registers stores imaginary values.

12. The system of claim 10, wherein the coefficient represents a value of a demodulating signal multiplied by one of a set of low pass filter coefficients.

13. The system of claim 12, wherein the set of low pass filter coefficients is 1, 3, 4, 4, 4, 3, 1.

14. The system of claim 12, wherein the demodulating signal is $\cos(k\beta) - j\sin(k\beta)$, where $j=\sqrt{-1}$, $\beta = 2\pi f_c/f_s$, $f_c$ is a carrier frequency, $f_s$ is a sampling frequency, and k is a sample index.

15. The system of claim 14, wherein $f_c=7$ MHz and $f_s=28$ million samples per second.

16. The system of claim 10, wherein at least one of the three shift-add-negate modules produces the output by shifting the received real sample value by at least one binary digit.

17. The system of claim 10, wherein at least one of the three shift-add-negate modules produces the output by shifting the real sample value by at least one binary digit and adding the real sample value to the shifted real sample value.

18. The system of claim 10, wherein at least one of the three shift-add-negate modules produces the output by negating the real sample value.

19. The system of claim 10, wherein at least one of the three shift-add-negate modules produces the output by shifting the real sample value by at least one binary digit and negating the shifted real sample value.

20. The system of claim 10, wherein at least one of the three shift-add-negate modules produces the output by shifting the real sample value by at least one binary digit, adds the real sample value to the shifted real sample value to produce a sum, and negates the sum.

21. The system of claim 10, wherein the multiplexer outputs three complex samples per symbol at a symbol rate of 2 million symbols per second.

22. The system of claim 10, wherein the multiplexer selectively outputs the contents of the three accumulators according to the state of a state machine.

23. A method for demodulation and low pass filtering, comprising the steps of:

receiving real samples;

producing values, each value being equivalent to a real sample multiplied by a coefficient that is a product of a demodulating signal and a low pass filter coefficient;

accumulating the values; and selectively outputting the accumulated values as complex samples.

24. The method of claim 23, wherein the step of producing values includes shifting the real sample value at least one binary digit.

25. The method of claim 23, wherein the step of producing values includes shifting the real sample value at least one binary digit and adding the shifted real sample value to the real sample value.

26. The method of claim 23, wherein the step of producing values includes negating the real sample value.

27. The method of claim 23, wherein the step of producing values includes shifting the real sample value at least one binary digit and negating the shifted sample value.

28. The method of claim 23, wherein the step of producing values includes shifting the real sample value at least one binary digit, adding the shifted real sample value to the real sample value to produce a sum, and negating the sum.

29. The method of claim 23, wherein the low pass filter coefficient is one of the set of low pass filter coefficients including 1, 3, 4, 4, 4, 3, 1.

30. The method of claim 23, wherein the step of accumulating the values includes accumulating real values and accumulating imaginary values.

31. A system for demodulation and low pass filtering, comprising:

means for receiving real samples;

means for producing values, each value being equivalent to a real sample multiplied by a coefficient that is a product of a demodulating signal and a low pass filter coefficient;

means for accumulating the values; and means for selectively outputting the accumulated values as complex samples.

* * * * *